(12) United States Patent
Liu et al.

(10) Patent No.: US 11,218,092 B2
(45) Date of Patent: Jan. 4, 2022

(54) POWER SUPPLY DEVICE OF REDUCED COMPLEXITY ACCEPTING POWER THROUGH WYE AND DELTA CONFIGURATIONS

(71) Applicant: HONGFUJIN PRECISION ELECTRONICS(TIANJIN)CO., LTD., Tianjin (CN)

(72) Inventors: Cheng-Chia Liu, Neihu (TW);
Chia-Peng Wang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 315 days.

(21) Appl. No.: 16/519,222

(22) Filed: Jul. 23, 2019

(65) Prior Publication Data
US 2020/0366219 A1     Nov. 19, 2020

(30) Foreign Application Priority Data
May 13, 2019    (CN) .......................... 201910395055.X

(51) Int. Cl.
*H02P 1/32*     (2006.01)
*H01H 9/56*    (2006.01)
*H02J 9/06*     (2006.01)

(52) U.S. Cl.
CPC ............... *H02P 1/32* (2013.01); *H01H 9/563* (2013.01); *H02J 9/06* (2013.01)

(58) Field of Classification Search
CPC ... H02P 1/32; H01H 9/563; H01H 9/56; H02J 9/06; H02M 7/06; H02M 1/44
See application file for complete search history.

(56) References Cited

U.S. PATENT DOCUMENTS

| | | | |
|---|---|---|---|
| 3,851,141 A * | 11/1974 | Cooper | B23K 9/1068 219/132 |
| 7,757,929 B2 * | 7/2010 | Ice | H05K 3/3405 228/180.21 |
| 9,413,259 B1 * | 8/2016 | Vinciarelli | H02M 3/1584 |
| 2006/0252313 A1 * | 11/2006 | Ice | H01R 12/725 439/736 |
| 2006/0263013 A1 * | 11/2006 | Sone | H01L 31/02005 385/89 |
| 2007/0145827 A1 * | 6/2007 | Paik | H02J 9/06 307/43 |
| 2010/0219687 A1 * | 9/2010 | Oh | G05F 1/46 307/39 |
| 2011/0089934 A1 * | 4/2011 | King | G01R 21/06 324/141 |
| 2013/0176753 A1 * | 7/2013 | Swamy | H02M 1/4216 363/37 |
| 2013/0198532 A1 * | 8/2013 | Bailey | G06F 1/26 713/300 |
| 2015/0195878 A1 * | 7/2015 | Garrity | H05B 45/382 315/186 |

(Continued)

*Primary Examiner* — Muhammad S Islam
*Assistant Examiner* — Devon A Joseph
(74) *Attorney, Agent, or Firm* — ScienBiziP, P.C.

(57) ABSTRACT

A power supply device includes connector from a power source, a rectifying module, a power supply module, and a bulk capacitor. The capacitor stores and smoothes the rectified power, and outputs the smoothed power to the power supply module. The connector is capable of connecting to the power source through a Delta connection and a Wye connection.

13 Claims, 17 Drawing Sheets

(56) References Cited

U.S. PATENT DOCUMENTS

| | | | | |
|---|---|---|---|---|
| 2017/0012423 A1* | 1/2017 | Arritt | ............... | G01R 31/62 |
| 2017/0033720 A1* | 2/2017 | Zeyn | ............... | H02P 25/184 |
| 2019/0181712 A1* | 6/2019 | Aso | ............ | H02K 15/12 |
| 2019/0305668 A1* | 10/2019 | Chu | ............ | H02M 1/32 |

* cited by examiner

POWER SUPPLY DEVICE OF REDUCED COMPLEXITY ACCEPTING POWER THROUGH WYE AND DELTA CONFIGURATIONS

FIELD

The subject matter herein generally relates to power supplies.

BACKGROUND

Industrial power in different countries or regions are usually provided by three phases of alternating current, either four-wire (delta or mesh connection) or five-wire (wye or star connection) means. For different connection means, the users needs different circuits to process power supply (such as rectification, amplification, etc) before using the power supply, which may cause waste of resources and inconvenience in use.

Therefore, there is room for improvement within the art.

BRIEF DESCRIPTION OF THE DRAWINGS

Implementations of the present disclosure will now be described, by way of embodiment, with reference to the attached figures.

DETAILED DESCRIPTION

Figure 1:
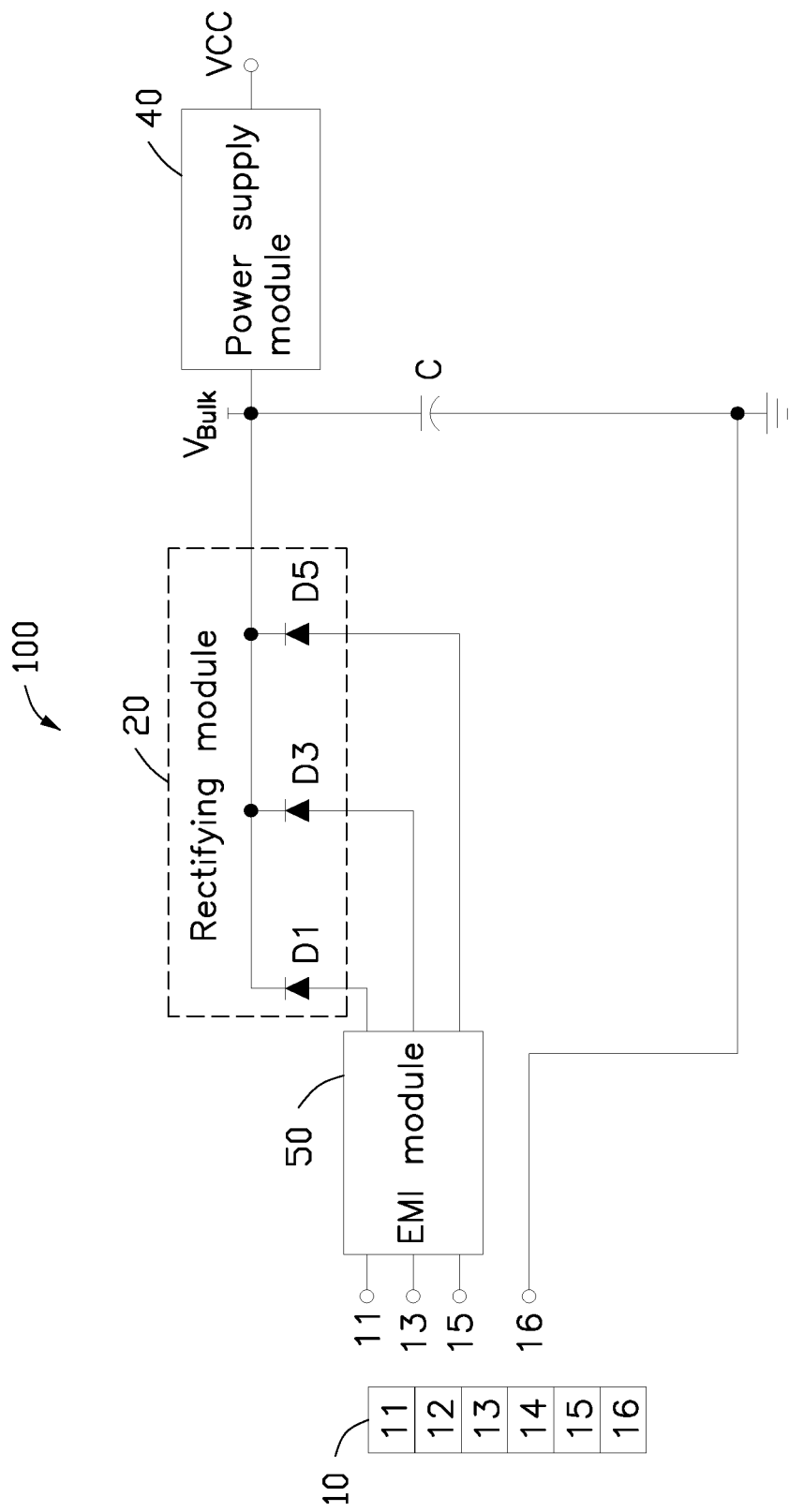
FIG. 1 is a circuit diagram of a first embodiment of a power supply device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series, and the like.

The present disclosure is described in relation to a power supply device.

FIG. 1 illustrates a circuit diagram of a first embodiment of a power supply device (power supply device 100). The power supply device 100 includes a connector 10, a rectifying module 20, a bulk capacitor C, and a power supply module 40 electrically connected in series. The connector 10 is configured for connecting to a power source. The power source can be a substation, and can be connected to the power supply device 100 through a three-phase four-wire (delta connection) and a three-phase five-wire (wye connection) as an input. The rectifying module 20 is configured for rectifying the power source. The bulk capacitor C is configured for storing and smoothing the rectified power source, and then outputting the smoothed power source to the power supply module 40. By arranging relationships between terminals of the delta connection and the wye connection and pins of the connector 10, the delta connection and the wye connection can share the connector 10.

In this embodiment, the connector 10 includes a first connector 11, a second connector 12, a second connector 13, a fourth pin 14, the fifth pin 15, and the sixth pin 16. The connector 10 can be connected to the power source through a delta connection or a Wye connection.

Figure 2:
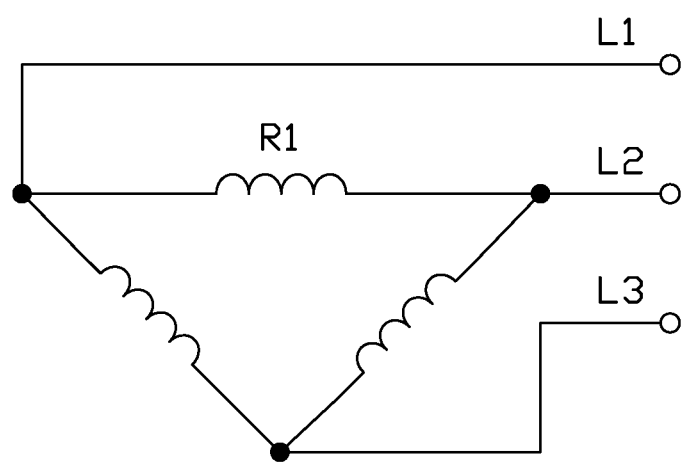
FIG. 2 is a circuit diagram of a conventional delta connection.
Figure 3:
FIG. 3 illustrates relationship between terminals of the delta connection of FIG. 2 and pins of a connector of the power supply device of FIG. 1.

Referring to FIG. 2, the delta connection includes three first resistors R1, which are electrically connected end to end to form a closed triangle. Each point between two first resistors R1 forms a terminal, being a first terminal L1, a second terminal L2, and a third terminal L3. A voltage between two terminals of the first terminal L1, the second terminal L2, and the third terminal L3 is defined as a line voltage VLine. A voltage across each first resistor R1 is defined as a phase voltage VPhase. VLine=VPhase. Referring to FIG. 3, when the connector 10 is electrically connected to the power source through the delta connection, the first terminal L1 and the second terminal L2 form first and second pins 11 and 12 of the connector 10, the second terminal L2 and the third terminal L3 form third and fourth pins 13 and 14, and the third terminal L3 and the first terminal L1 form fifth and sixth pins 15 and 16.

Figure 4:
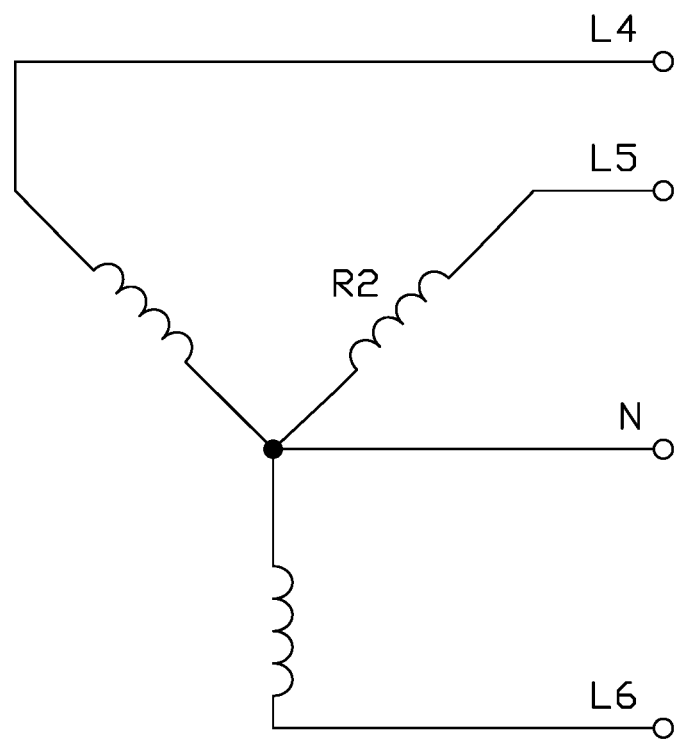
FIG. 4 is a circuit diagram of a conventional wye connection.
Figure 5:
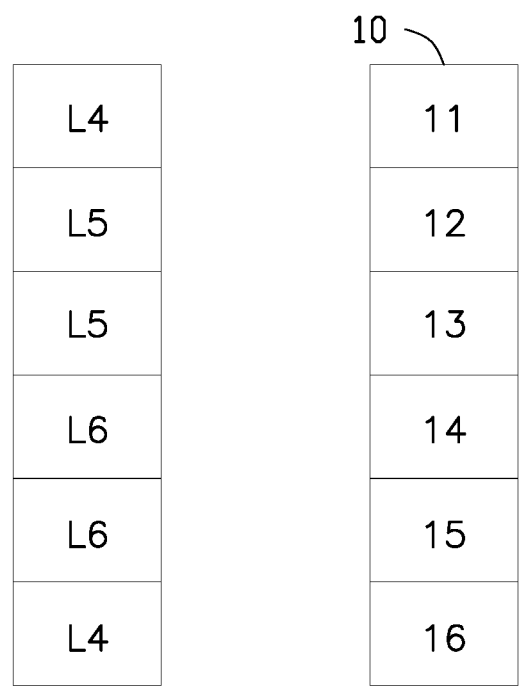
FIG. 5 illustrates relationship between terminals of the wye connection of FIG. 4 and the pins of the connector of the power supply device of FIG. 1.

Referring to FIG. 4, the wye connection includes three second resistors R2. Ends of each second resistor R2 are connected together to form a node N. Other ends of each second resistor R2 respectively form a fourth terminal L4, a fifth terminal L5, and a sixth terminal L6. A voltage between two terminals is defined as a line voltage VLine. A voltage across each second resistor R2 is defined as a phase voltage VPhase. VLine=$\sqrt{3}$×VPhase. Referring to FIG. 5, when the connector 10 is electrically connected to the power source through the wye connection, the fourth terminal L4 and the node N form first and second pins 11 and 12 of the connector 10, the fifth terminal L5 and the node N form third and fourth pins 13 and 14, and the sixth terminal L6 and the node N form the fifth and sixth pins 15 and 16.

Referring to FIG. 1, the first pin 11, the third pin 13, and the fifth pin 15 are electrically connected to an end of the bulk capacitor C and the power module 40 through the rectifying module 20. The sixth pin 16 is electrically connected to the other end of the bulk capacitor C, and is grounded. The rectifying module 20 rectifies the power. The bulk capacitor C stores and smoothes the rectified power, and outputs the smoothed power to the power supply module 40.

Figure 6A:
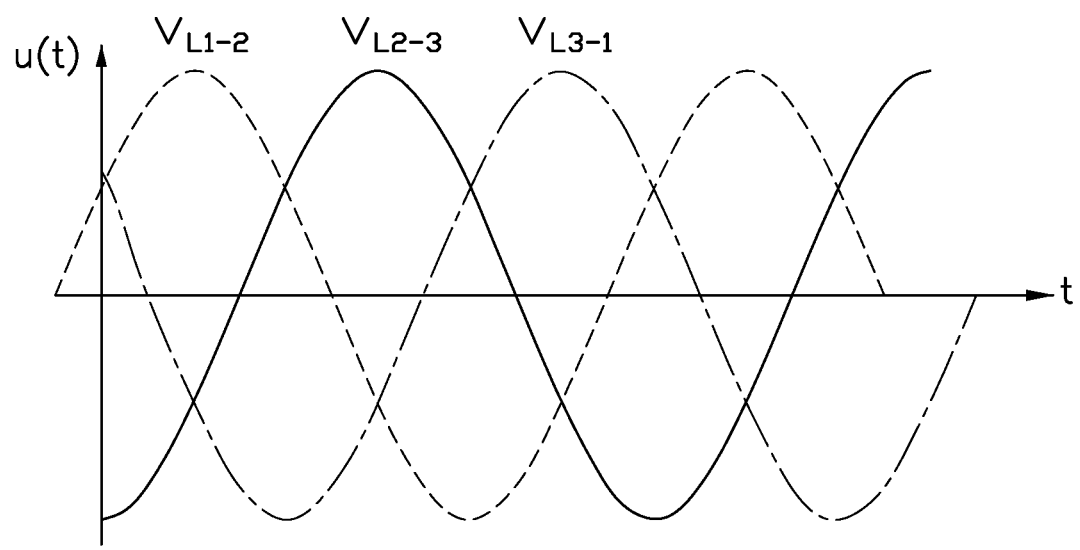
FIG. 6A is a waveform diagram of line voltages of the power supply device of FIG. 1 when a power source is electrically connected to the power supply device through the delta connection.
Figure 6B:
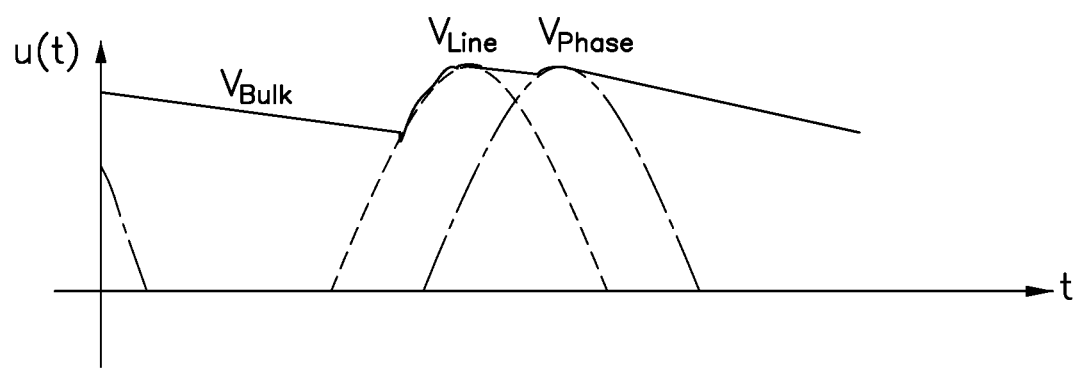
FIG. 6B is a waveform diagram of a voltage of a bulk capacitor of the power supply device of FIG. 1 when a power source is electrically connected to the power supply device through the delta connection.
Figure 7A:
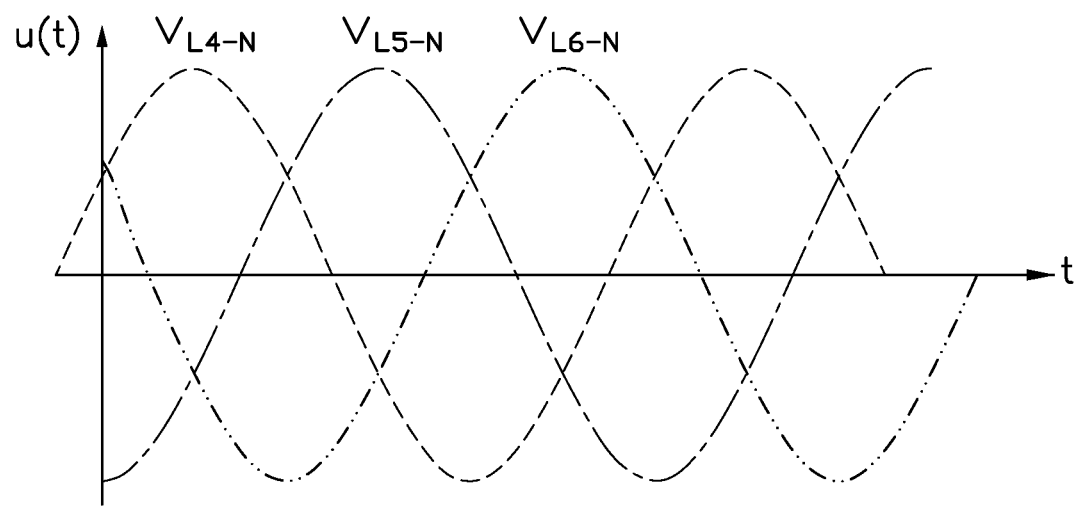
FIG. 7A is a waveform diagram of phase voltages of the power supply device of FIG. 1 when the power source is electrically connected to the power supply device through the wye connection.
Figure 7B:
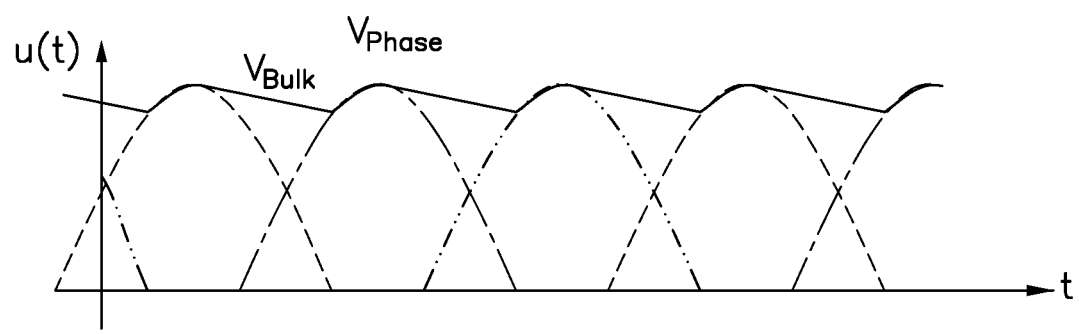
FIG. 7B is a waveform diagram of a voltage of the bulk capacitor of the power supply device of FIG. 1 when the power source is electrically connected to the power supply device through the wye connection.

Referring to FIGS. 6A and 6B, VL1-2, VL2-3, VL3-1 respectively represent line voltage between the first terminal L1 and the second terminal L2, line voltage between the second terminal L2 and the third terminal L3, and line voltage between the third terminal L3 and the first terminal L1. Referring to FIG. 7A and FIG. 7B, VL4-N, VL5-N, VL6-N respectively represent phase voltage between the fourth terminal L4 and the node N, phase voltage between the fifth terminal L5 and the node N, and phase voltage between the sixth terminal L6 and the node N. VBulk represents the voltage across the bulk capacitor C. A peak value of the voltage VBulk is equal to a peak value of the phase voltage VPhase. As shown in FIGS. 6A, 6B, 7A and 7B, the bulk capacitor C can reduce a continuous wave voltage thereby smoothing the rectified power.

Figure 8:
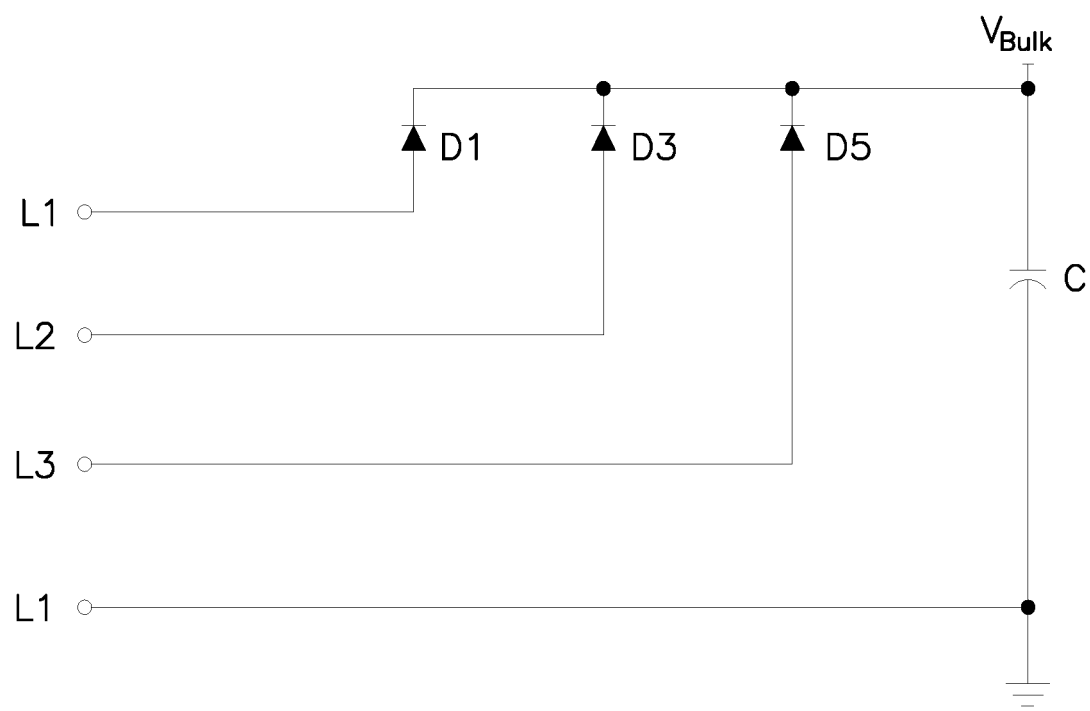
FIG. 8 is an equivalent circuit diagram of the power supply device of FIG. 1 when the power source is electrically connected to the power supply device through the delta connection.
Figure 9:
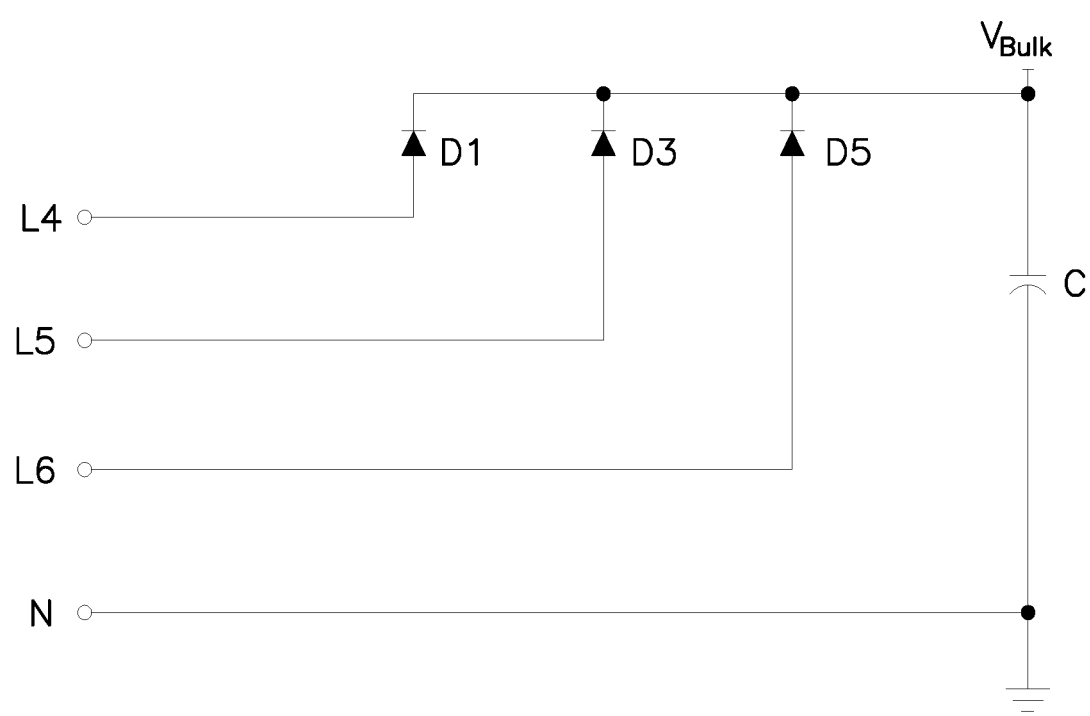
FIG. 9 is an equivalent circuit diagram of the power supply device of FIG. 1 when the power source is electrically connected to the power supply device through the wye connection.

In this embodiment, the rectifying module 20 includes three diodes D1, D2, and D3, respectively connected between the bulk capacitor C and each of the first pin 11, the third pin 13, and the fifth pin 15. In other embodiment, the diodes D1, D2, D3 may be replaced by a rectifier that rectifies the power by receiving additional controlling signals. FIG. 8 and FIG. 9 illustrate equivalent circuit diagrams of the power supply device 100 when the power source is electrically connected to the power supply device 100 through the delta connection and the wye connection. As shown in FIG. 8 and FIG. 9, the delta connection and the wye connection can share the connector 10 as an input plug.

In other embodiment, the power supply device 100 further includes an electromagnetic interference (EMI) module 50. One end of the EMI module 50 is electrically connected to the first pin 11, the third pin 13, and the fifth pin 15. Other end of the EMI module 50 is electrically connected to the rectifying module 20. The EMI module 50 reduces EMI generated by the power module 40.

Figure 10:
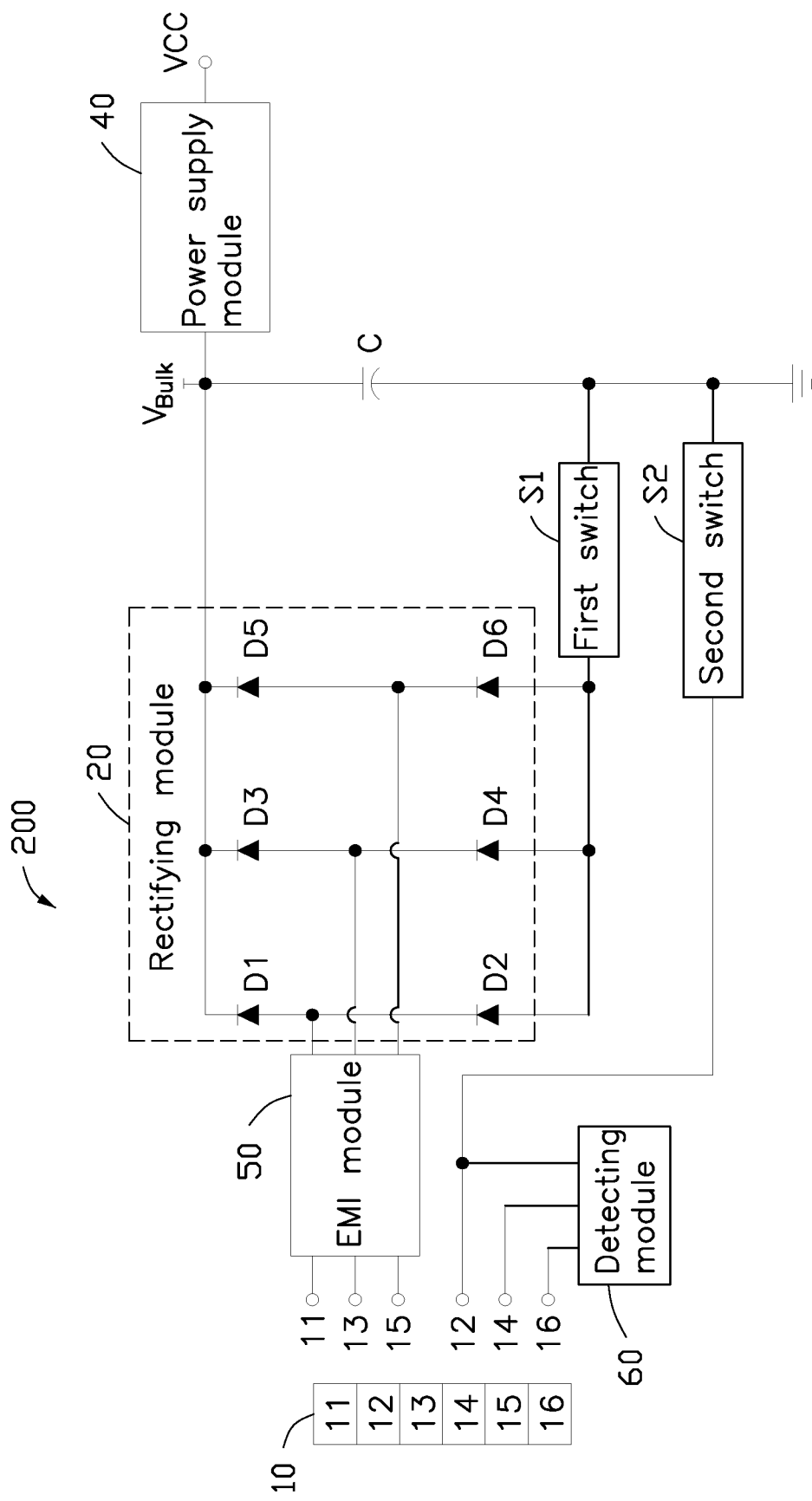
FIG. 10 is a circuit diagram of a second embodiment of a power supply device.

FIG. 10 illustrates a circuit diagram of a second embodiment of a power supply device (power supply device 200). The structure and working principles of the power supply device 200 are substantially similar to those of the power supply device 100. The difference therebetween is that the power supply device 200 further includes a first switch S1, a second switch S2, and a detecting module 60. An end of the first switch S1 is electrically connected to the rectifying module 20. Other end of the first switch S1 is electrically connected to the other end of the bulk capacitor C, and is grounded.

One end of the second switch S2 is electrically connected to the second pin 12. Other end of the second switch S2 is electrically connected to the other end of the bulk capacitor C, and is grounded. The detecting module 60 is electrically connected to the second pin 12, the fourth pin 14, the sixth pin 16, the first switch S1, and the second switch S2. The detecting module 60 detects a voltage between the second pin 12 and the fourth pin 14 and a voltage between the fourth pin 14 and the sixth pin 16. The detecting module 60 further controls the first switch S1 and the second switch S2 according to the voltage which is detected.

In this embodiment, the rectifying module 20 includes six diodes D1, D2, D3, D4, D5, and D6. Three of the diodes D1, D3, and D5 are respectively connected between the bulk capacitor C and each of the first pin 11, the third pin 13, and the fifth pin 15. The other three diodes D2, D4, and D6 are respectively connected between the first switch S1 and each of the first pin 11, the third pin 13, and the fifth pin 15.

Figure 11:
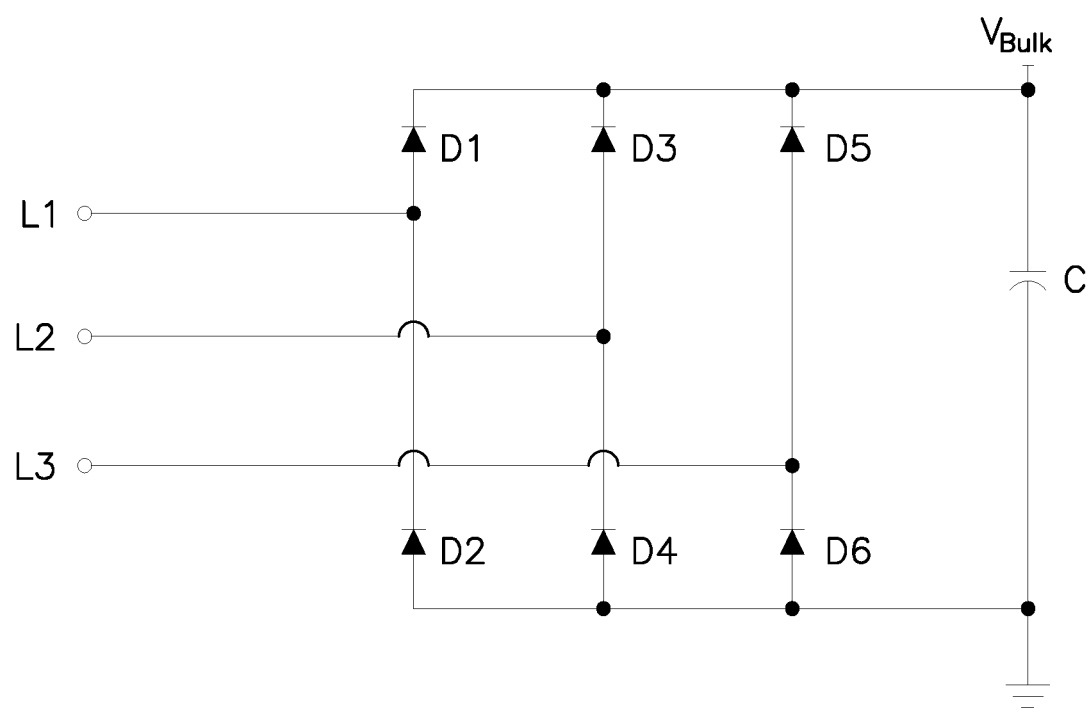
FIG. 11 is an equivalent circuit diagram of the power supply device of FIG. 10 when the power source is electrically connected to the power supply device through the delta connection.
Figure 12A:
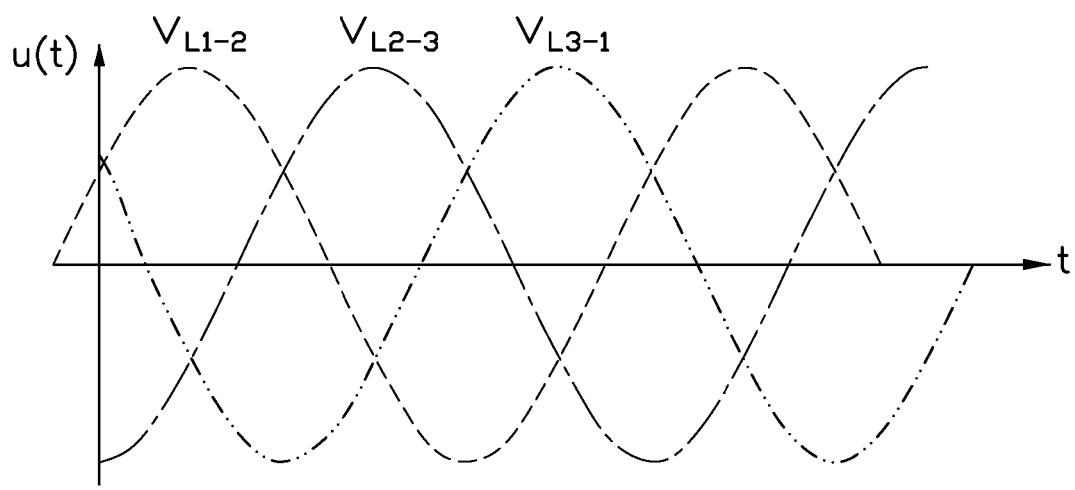
FIG. 12A is a waveform diagram of line voltages of the power supply device of FIG. 10 when the power source is electrically connected to the power supply device through the delta connection.
Figure 12B:
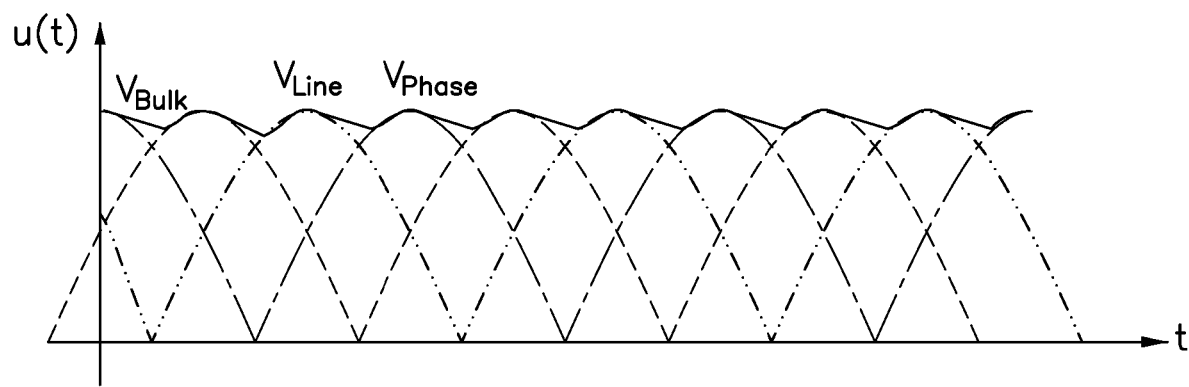
FIG. 12B is a waveform diagrams of the bulk capacitor of the power supply device of FIG. 10 when the power source is electrically connected to the power supply device through the delta connection.
Figure 13:
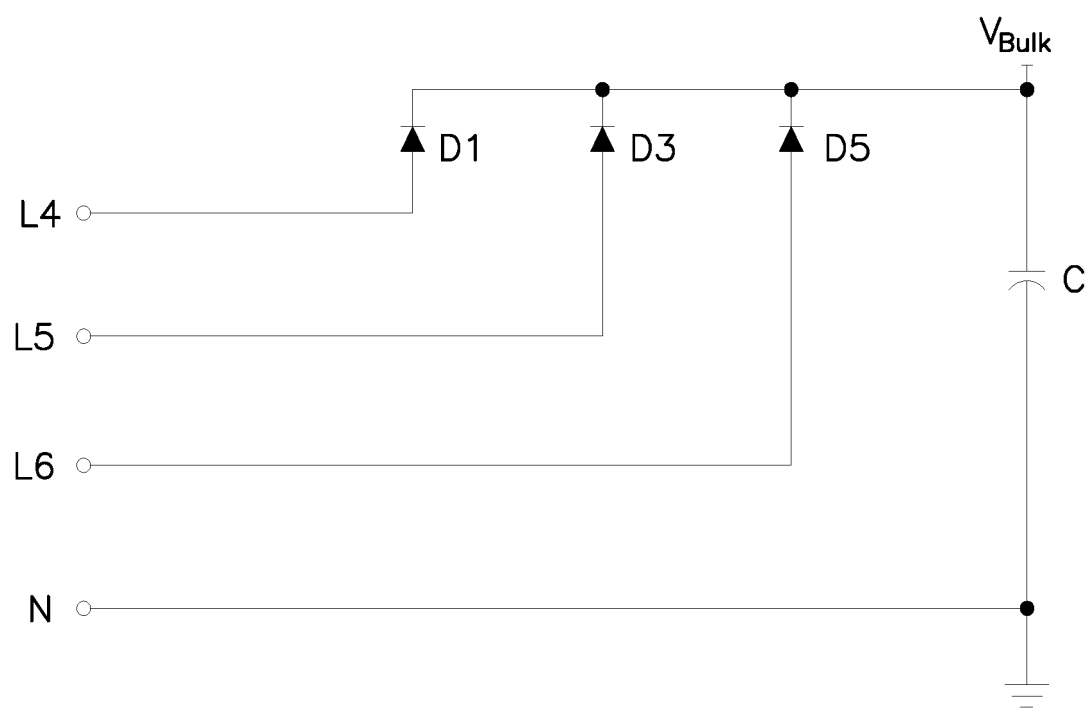
FIG. 13 is an equivalent circuit diagram of the power supply device of FIG. 10 when the power source is electrically connected to the power supply device through the wye connection.
Figure 14A:
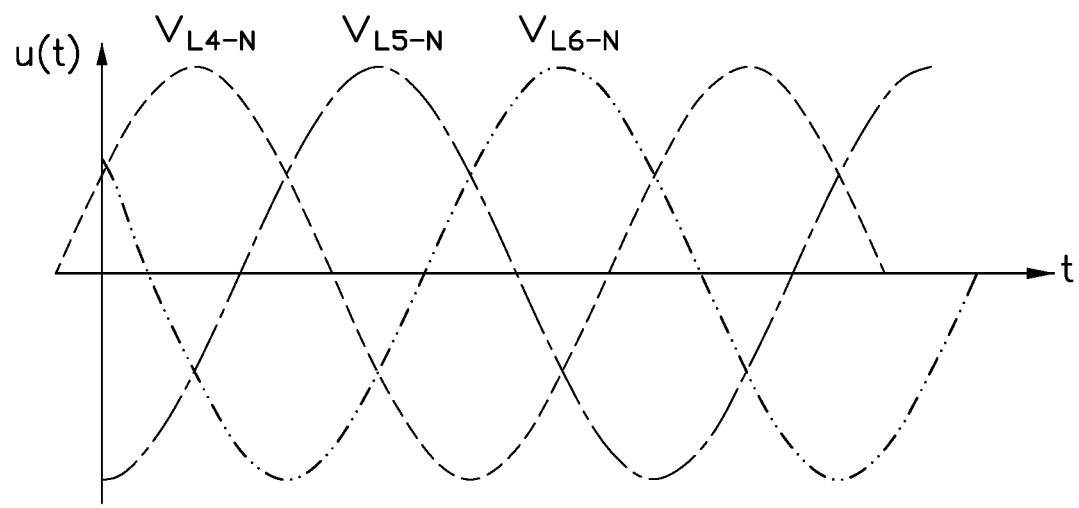
FIG. 14A is a waveform diagram of phase voltages of the power supply device of FIG. 10 when the power source is electrically connected to the power supply device through the wye connection.
Figure 14B:
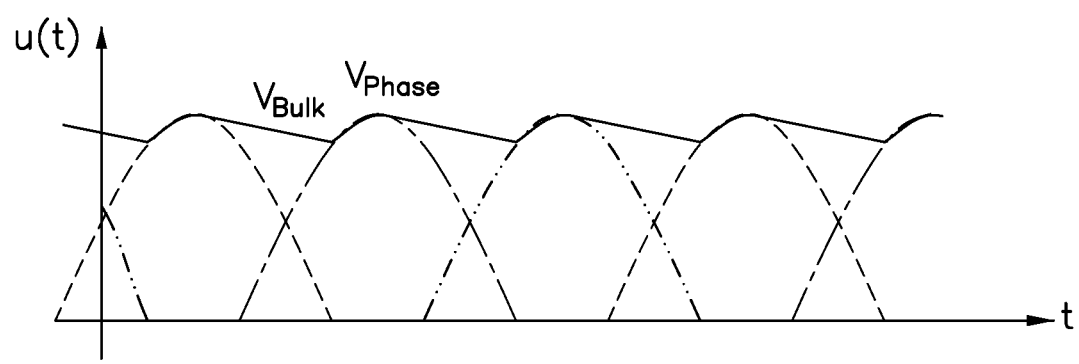
FIG. 14B is a waveform diagram of the voltage of the bulk capacitor of the power supply device of FIG. 10 when the power source is electrically connected to the power supply device through the wye connection.

In this embodiment, when the connector 10 is electrically connected to the power source through the delta connection, the first switch S1 is turned off, and the second switch S2 is turned on. FIG. 11 illustrates an equivalent circuit of the power supply device 100 when the input is the delta connection. Referring to FIGS. 12A and 12B, VL1-2, VL2-3, and VL3-1 respectively represent line voltage between the first terminal L1 and the second terminal L2, line voltage between the second terminal L2 and the third terminal L3, and line voltage between the third terminal L3 and the first terminal L1. When the connector 10 is electrically connected to the power source through the wye connection, the first switch S1 is turned on, and the second switch S2 is turned off. FIG. 13 illustrates an equivalent circuit diagram of the power supply device of FIG. 10 when the power source is electrically connected to the power supply device 100 through the wye connection. Referring to FIGS. 14A and 14B, VL4-N, VL5-N, and VL6-N respectively represent phase voltage between the fourth terminal L4 and the node N, phase voltage between the fifth terminal L5 and the node N, and phase voltage between the sixth terminal L6 and the node N. The voltage VBulk represents the voltage across the bulk capacitor C. A peak value of the voltage VBulk across the bulk capacitor C is equal to a peak value of the phase voltage VPhase. As shown in FIGS. 11, 12A, 12B, 13, 14A, and 14B, the delta connection and the wye connection can share the connector 10 as an input plug.

Figure 15:
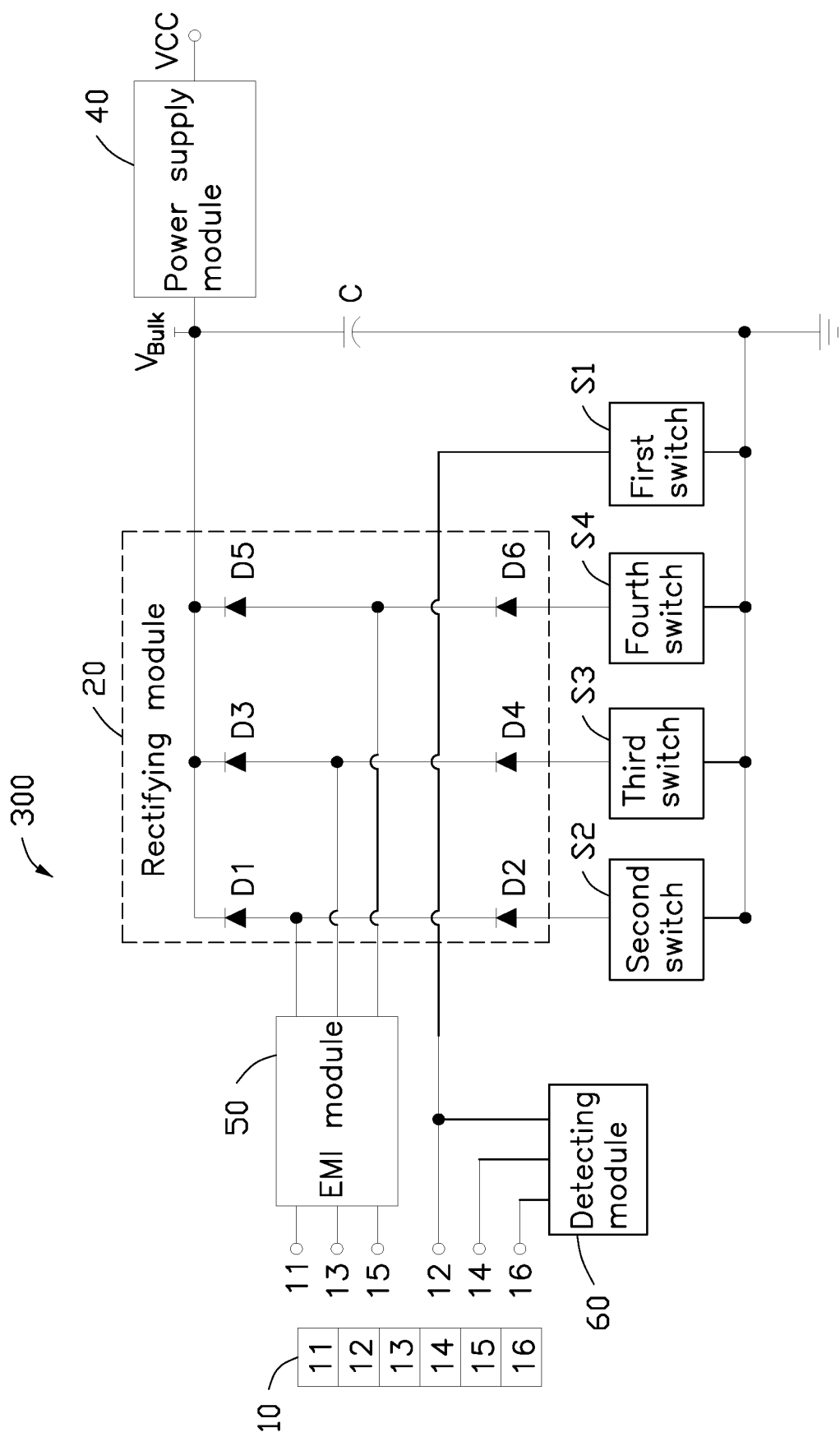
FIG. 15 is a circuit diagram of a third embodiment of a power supply device.

FIG. 15 illustrates a circuit diagram of a third embodiment of a power supply device (power supply device 300). The structure and working principles of the power supply device 300 are substantially similar to those of the power supply device 100. The difference therebetween is that the power supply device 300 further includes a first switch S1, a second switch S2, a third switch S3, a fourth switch S4, and a detecting module 60. One end of the first switch S1 is electrically connected to the second pin 12. Other end of the first switch S1 is electrically connected to the other end of the bulk capacitor C. One end of each of the second switch S2, the third switch S3, and the fourth switch S4 are respectively connected to the first pin 11, the third pin 13, and the fifth pin 15 through the rectifying module 20. The other end of each of the second switch S2, the third switch S3, and the fourth switch S4 are electrically connected to the other end of the bulk capacitor C, and are grounded. The detecting module 60 detects a voltage between the second pin 12 and the fourth pin 14 and a voltage between the fourth pin 14 and the sixth pin 16. The detecting module 60 further controls the first switch S1, the second switch S2, the third switch S3, and the fourth switch S4 according to the voltages which are detected.

In this embodiment, the rectifying module 20 includes six diodes D1, D2, D3, D4, D5, and D6. Three of the diodes D1, D3, and D5 are respectively connected between the bulk capacitor C and each of the first pin 11, the third pin 13, and the fifth pin 15. The diode D2 is connected between the first pin 11 and the second switch S2. The diode D4 is connected between the third pin 13 and the third switch S3. The diode D6 is connected between the fifth pin 15 and the fourth switch S4.

Figure 16:
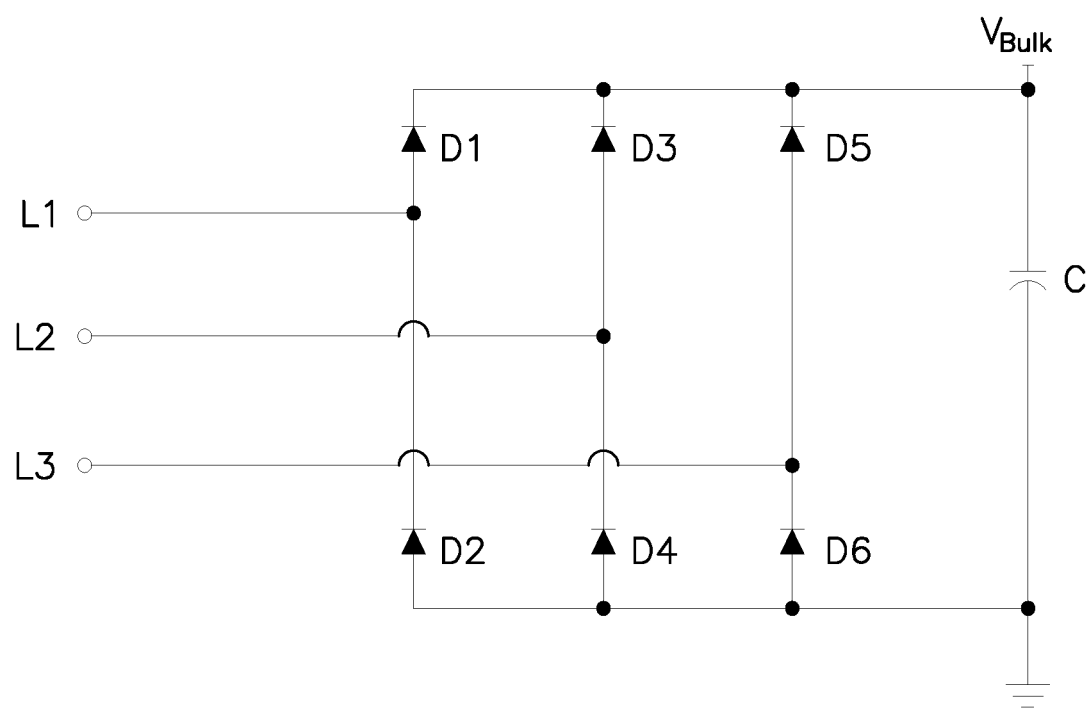
FIG. 16 is an equivalent circuit diagram of the power supply device of FIG. 15 when the power source is electrically connected to the power supply device through the wye connection and the input is at a high level.
Figure 17A:
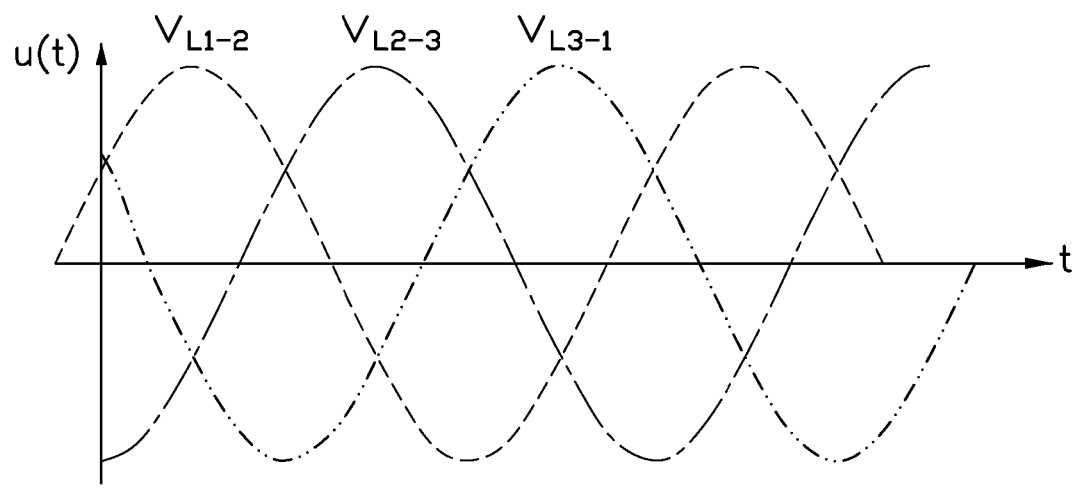
FIG. 17A is a waveform diagram of phase voltages of the power supply device of FIG. 15 when the power source is electrically connected to the power supply device through the wye connection and the input is at a high level.
Figure 17B:
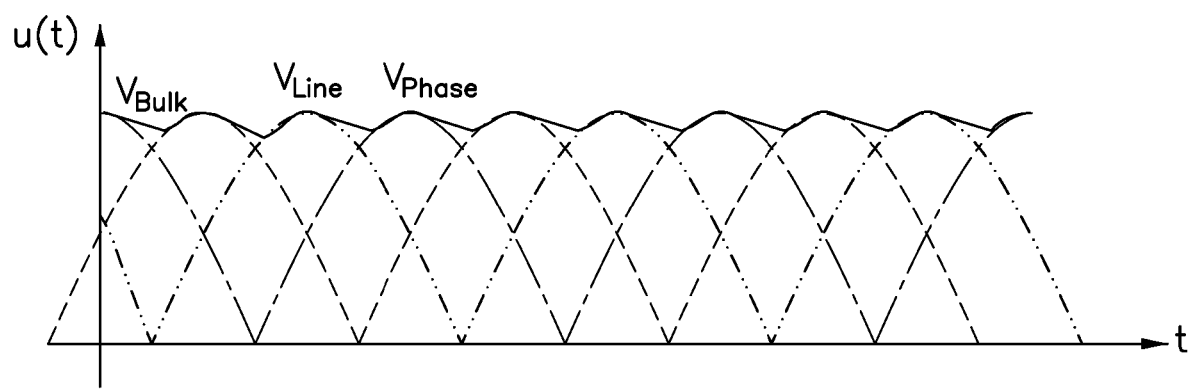
FIG. 17B are waveform diagrams of phase voltages of the voltage of the bulk capacitor when the power source is electrically connected to the power supply device through the wye connection and the input is at a high level.

In this embodiment, when the connector 10 is electrically connected to the power source through the delta connection, the first switch S1 is turned off, and the second, third, and fourth switches S2, S3, and S4 are turned on. The equivalent circuit of the power supply device 100 and the waveforms of the line voltage VLine and the voltage VBulk are as shown in FIGS. 11, 12A, and 12B, respectively. When the connector 10 is electrically connected to the power source through the wye connection, and the input is at a high level, the first switch S1 is turned on, and the second switch S2, the third switch S3, and the fourth switch S4 are turned off. The equivalent circuit of the power supply device 100 and the waveforms of the line voltage VPhase and the voltage VBulk are as shown in FIGS. 13, 14A, and 14B, respectively. When the connector 10 is electrically connected to the power source through the wye connection, and the input is at a low level, the first switch S1 is turned off, and the second switch S2, the third switch S3, and the fourth switch S4 are turned on. The equivalent circuit of the power supply device 100 and the waveforms of the line voltage VLine and the voltage VBulk are shown in FIG. 16, FIG. 17A, and FIG. 17B, respectively. VL1-2, VL2-3, and VL3-1 respectively represent line voltage between the first terminal L1 and the second terminal L2, line voltage between the second terminal L2 and the third terminal L3, and line voltage between the third terminal L3 and the first terminal L1. VBulk represents the voltage across the bulk capacitor C. A peak value of the voltage VBulk is equal to a peak value of the line voltage, and also is equal to a peak value of the phase voltage VPhase multiplied by $\sqrt{3}$. As shown in FIGS. 11, 12A, 12B, 16, 17A, and 17B, the delta connection and the wye connection can share the connector 10 as the input plug. In addition, in this embodiment, when the voltage of the bulk capacitor C is increased, the continuous current from the capacitor C can be reduced to increase the service life.

In other embodiment, the power supply module 40 can be one of a computer power supply unit and a DC-DC converter.

By arranging relationships between terminals of the delta connection and the wye connection and pins of the connector 10, the delta connection and the wye connection can share the connector 10 and parts of other circuits of the power supply device. Thus resources are no longer wasted. Moreover, the power supply devices 100 and 200 employ relative fewer switches, which saves space and reduces production costs.

The embodiments shown and described above are only examples. Many details are often found in the relevant art. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supply device comprising:
    a connector, configured for connecting to a power source through one of a delta connection and a Wye connection, the connector comprising a first pin, a second pin, a third pin, a fourth pin, a fifth pin, and a sixth pin,
    wherein the delta connection comprises three first resistors sequentially connected end to end to form a closed triangle, each point between two first resistors forms one of a first terminal, a second terminal, and a third terminal, when the connector is electrically connected to the power source through the delta connection, the first terminal and the second terminal form the first pin and the second pin, the second terminal and the third terminal form the third pin and the fourth pin, the third terminal and the first terminal form the fifth pin and the sixth pin of the connector,
    wherein the wye connection comprises three second resistors, ends of each second resistor are connected together to form a node, other ends of each second resistor respectively form a fourth terminal, a fifth terminal, and a sixth terminal, when the connector is electrically connected to the power source through the wye connection, the fourth terminal and the node form the first pin and the second pin, the fifth terminal and the node form the third pin and the fourth pin, the sixth terminal and the node form the fifth pin and the sixth pin of the connector;

a rectifying module electrically connected to the connector and configured for rectifying a power;

a power supply module;

a bulk capacitor configured for storing and smoothing the rectified power, and outputting the smoothed power to the power supply module; wherein the power supply module is electrically connected to the connector through the bulk capacitor;

a first switch, an end of the first switch electrically connected to the rectifying module, other end of the first switch electrically connected to an end of the bulk capacitor and grounded;

a second switch, an end of the second switch electrically connected to the second pin, other end of the second switch electrically connected to the bulk capacitor and grounded; and a detecting module, the detecting module electrically connected to the second pin, the fourth pin, the sixth pin, and the second switch, wherein the detecting module detects a voltage between the second pin and the fourth pin and a voltage between the fourth pin and the sixth pin, the detecting module is configured to control the first switch and the second switch according to the voltage which is detected.

2. The power supply device of claim 1, wherein when the connector is electrically connected to the power source through the delta connection, the first switch is turned off, and the second switch is turned on, when the connector is electrically connected to the power source through the wye connection, the first switch is turned on, and the second switch is turned off.

3. The power supply device of claim 1, further comprising, a third switch, a fourth switch, and a detecting module, wherein an end of the first switch is electrically connected to the second pin, other end of the first switch is electrically connected to the other end of the bulk capacitor, an end of each of the second switch, the third switch, and the fourth switch are respectively connected to the first pin, the third pin, and the fifth pin through the rectifying module, other end of each of the second switch, the third switch, and the fourth switch is electrically connected to the other end of the bulk capacitor, and grounded, the detecting module detects a voltage between the second pin and the fourth pin and a voltage between the fourth pin and the sixth pin, the detecting module further controls the first switch, the second switch, the third switch, and the fourth switch according to the voltage which is detected.

4. The power supply device of claim 3, wherein when the connector is electrically connected the power source through the delta connection, the first switch is turned off, and the second switch, the third switch, and the fourth switch are turned on, when the connector is electrically connected to the power source through the wye connection, and an input is at a high level, the first switch is turned on, and the second switch, the third switch, and the fourth switch are turned off, when the connector is electrically connected to the power source through the wye connection, and the input is at a low level, the first switch is turned off, and the second switch, the third switch, and the fourth switch are turned on.

5. The power supply device of claim 3, wherein the rectifying module comprises six diodes, three of the diodes are respectively connected between the bulk capacitor and each of the first pin, the third pin, and the fifth pin and, the other three diodes are respectively connected between the first pin and the second switch, between the fourth switch and each of the third pin and the third switch, and between the fifth pin.

6. The power supply device of claim 1, further comprising an Electro-Magnetic Interference (EMI) module, wherein an end of the EMI module is electrically connected to the first pin, the third pin, and the fifth pin, other end of the EMI module is electrically connected to the rectifying module.

7. The power supply device of claim 1, wherein the rectifying module comprises three diodes respectively connected between the bulk capacitor and each of the first pin, the third pin, and the fifth pin.

8. The power supply device of claim 1, wherein the rectifying module comprises six diodes, three of the diodes are respectively connected between the bulk capacitor and each of the first pin, the third pin, the fifth pin, the other three diodes are respectively connected between the first switch and each of the first pin, the third pin, and the fifth pin.

9. A power supply device comprising:

a connector configured for connecting to a power source, the connector comprising a first pin, a second pin, a third pin, a fourth pin, a fifth pin, and a sixth pin;

a rectifying module electrically connected to the connector and configured for rectifying a power;

a power supply module;

a bulk capacitor configured for storing and smoothing the rectified power source, the stored power, and outputting the smoothed power to the power supply module, wherein the connector is capable of both connecting to the power source through a delta connection and a Wye connection; the power supply module is electrically connected to the connector through the bulk capacitor;

a first switch;

a second switch; and a detecting module;

wherein the delta connection comprises three first resistors sequentially connected end to end to form a closed triangle, each point between two first resistors forms one of a first terminal, a second terminal, and a third terminal, when the connector is electrically connected to the power source through the delta connection, the first terminal and the second terminal form the first pin and the second pin, the second terminal and the third terminal form the third pin and the fourth pin, the third terminal and the first terminal form the fifth pin and the sixth pin of the connector;

wherein the wye connection comprises three second resistors, ends of each second resistor are connected together to form a node, other ends of each second resistor respectively form a fourth terminal, a fifth terminal, and a sixth terminal, when the connector is electrically connected to the power source through the wye connection, the fourth terminal and the node form the first pin and the second pin, the fifth terminal and the node form the third pin and the fourth pin, the sixth terminal and the node form the fifth pin and the sixth pin of the connector;

wherein an end of the first switch is electrically connected to the rectifying module, other end of the first switch is electrically connected to the bulk capacitor and is grounded, an end of the second switch is electrically connected to the second pin, other end of the second switch is electrically connected to the bulk capacitor, and is grounded, the detecting module is electrically connected to the second pin, the fourth pin, the sixth pin, and the second switch, the detecting module detects a voltage between the second pin and the fourth pin and a voltage between the fourth pin and the sixth pin, the detecting module further controls the first switch and the second switch according to the voltage which is detected.

10. The power supply device of claim 9, wherein when the connector is electrically connected to the power source through the delta connection, the first switch is turned off, and the second switch is turned on, when the connector is electrically connected to the power source through the wye connection, the first switch is turned on, and the second switch is turned off.

11. The power supply device of claim 9, further comprising a third switch, a fourth switch, and a detecting module, wherein an end of the first switch is electrically connected to the second pin, other end of the first switch is electrically connected to the other end of the bulk capacitor, an end of each of the second switch, the third switch, and the fourth switch are respectively connected to the first pin, the third pin, and the fifth pin through the rectifying module, other end of each of the second switch, the third switch, and the fourth switch is electrically connected to the other end of the bulk capacitor, and grounded, the detecting module detects a voltage between the second pin and the fourth pin and a voltage between the fourth pin and the sixth pin, the detecting module further controls the first switch, the second switch, the third switch, and the fourth switch according to the voltage which is detected.

12. The power supply device of claim 11, wherein when the connector is electrically connected the power source through the delta connection, the first switch is turned off, and the second switch, the third switch, and the fourth switch are turned on, when the connector is electrically connected to the power source through the wye connection, and an input is at a high level, the first switch is turned on, and the second switch, the third switch, and the fourth switch are turned off, when the connector is electrically connected to the power source through the wye connection, and the input is at a low level, the first switch is turned off, and the second switch, the third switch, and the fourth switch are turned on.

13. The power supply device of claim 9, further includes an Electro-Magnetic Interference (EMI) module, an end of the EMI module is electrically connected to the first pin, the third pin, and the fifth pin, other end of the EMI module is electrically connected to the rectifying module.

* * * * *